United States Patent
Homann et al.

(10) Patent No.: US 7,017,982 B2
(45) Date of Patent: Mar. 28, 2006

(54) REMOVABLE ROOF FOR A MOTOR VEHICLE AND METHOD OF MAKING SAME

(75) Inventors: Bodo Homann, Heimsheim (DE); Kurt Pfertner, Ditzingen (DE); Andre Scholz, Wiernsheim (DE); Reiner Armbruster, Muehlacker (DE)

(73) Assignee: Dr. Ing. h.c.F. Porsche Aktiengesellschaft, Stuttgart (DE)

(*) Notice: Subject to any disclaimer, the term of this patent is extended or adjusted under 35 U.S.C. 154(b) by 0 days.

(21) Appl. No.: 10/716,943

(22) Filed: Nov. 20, 2003

(65) Prior Publication Data
US 2004/0150254 A1  Aug. 5, 2004

(30) Foreign Application Priority Data
Nov. 20, 2002  (DE) ................. 102 54 132

(51) Int. Cl.
*B60J 7/11* (2006.01)
*B60J 7/19* (2006.01)

(52) U.S. Cl. ............... 296/218; 296/224; 292/DIG. 5

(58) Field of Classification Search ............... 296/218, 296/224, 216.09, 219, 210, 181.2, 181.6, 296/191, 901.01, 213, 220.01, 208; 292/DIG. 5
See application file for complete search history.

(56) References Cited

U.S. PATENT DOCUMENTS

| | | | |
|---|---|---|---|
| 3,683,993 A * | 8/1972 | Perks .................... 160/37 |
| 4,133,576 A | 1/1979 | Chrysler | |
| RE32,496 E * | 9/1987 | Chrysler ................. 296/218 |
| 5,041,318 A * | 8/1991 | Hulls ...................... 428/57 |
| 5,042,873 A | 8/1991 | Yagami | |
| 5,052,743 A | 10/1991 | Inada et al. | |
| 6,189,962 B1 * | 2/2001 | Henderson ............... 296/218 |
| 6,270,154 B1 * | 8/2001 | Farber .................... 296/213 |
| 2002/0166235 A1 | 11/2002 | Tarahomi | |

FOREIGN PATENT DOCUMENTS

| | | | | |
|---|---|---|---|---|
| DE | 1804687 | | 5/1969 | |
| DE | 29 29 915 | | 2/1981 | |
| DE | 3732581 A1 | | 4/1989 | |
| DE | G9406435.0 | * | 7/1994 | ............ 296/218 |
| EP | 1086882 A2 | | 3/2001 | |
| GB | 1162627 | * | 8/1969 | ............ 296/218 |
| GB | 2086316 A | | 5/1982 | |
| JP | 28016 | * | 3/1981 | ............ 296/218 |

OTHER PUBLICATIONS

European Search Report Mailed Apr. 19, 2004.
German Office Action dated Mar. 18, 2005 with English translation.

\* cited by examiner

*Primary Examiner*—Dennis H. Pedder
(74) *Attorney, Agent, or Firm*—Crowell & Moring LLP

(57) ABSTRACT

A removable roof is provided for a passenger car of the sports car type, between a windshield frame and a rollover bar system, which roof is made of a plastic material and includes an exterior wall as well as an interior wall. In order to create a highly stressable, light-weight and space-saving roof, the exterior wall as well as the interior wall are made of a high-strength plastic material and form a rigid member connection, the exterior wall and the interior wall meeting essentially only at edge zones.

26 Claims, 3 Drawing Sheets

REMOVABLE ROOF FOR A MOTOR VEHICLE AND METHOD OF MAKING SAME

BACKGROUND AND SUMMARY OF THE INVENTION

This application claims the priority of application no. 102 54 132.9 filed in Germany on Nov. 20, 2002, the disclosure of which is expressly incorporated by reference herein.

The invention relates to a removable roof for a motor vehicle, particularly a passenger car of the sports car type, between a windshield frame and a rollover bar system.

A roof is known from U.S. Pat. No. 4,133,576 which is inserted into an opening of a vehicle body structure and has two roof halves fitted together in a longitudinal center plane. In one embodiment, a sealing body, which sealingly cooperates with frame profiles of the two roof halves, extends along the longitudinal center plane.

From German Patent Document DE 29 29 915 A1, a roof arrangement for a motor vehicle is known, which has two roof parts which can be detached from a vehicle body, are mutually connected in a longitudinal center plane of the motor vehicle and are supported by fixed frame parts of the vehicle body. Sealing bodies are provided between the frame parts and the roof parts, are held on the above-mentioned frame parts and, together with sealing sections of the roof parts, implement a sealing function. Each roof part is made of a glass-fiber-reinforced plastic material and has an exterior wall and a first interior wall and a second interior wall, which interior walls have a clearly thicker wall thickness than the exterior wall.

It is an object of the invention to provide a removable roof for a passenger car which, while its weight is low, has a high stability. In this case, the roof should constructively be designed such that at least sufficient headroom for the occupants of a passenger car of a defined height is provided.

According to the invention, this is achieved by providing a removable roof for a motor vehicle, particularly a passenger car of the sports car type, between a windshield frame and a rollover bar system, which roof is made of a plastic material and comprises an exterior wall as well as an interior wall, wherein the exterior wall and the interior wall of the roof are made of a high-strength plastic material and form a rigid member connection, the exterior wall and the interior wall essentially meeting only at edge zones of the roof.

Important advantages achieved by means of preferred embodiments of the invention are that the exterior wall and the interior wall, which consist of a high-strength plastic material and are relatively thin-walled, form a rigid support connection, whereby the roof elements of the roof easily withstand not only the strains, for example, between a windshield frame and a rollover bar, but also have a weight which promotes an easy handling—mounting and demounting. The exterior wall and the interior wall extend at a relatively narrow distance from one another which, at the given vehicle height, ensures an acceptably good headroom for the occupants of the passenger car. Finally, the profilings of the interior wall, on the one hand, optimize the stability of the roof elements and, on the other hand, are suitable for receiving add-on pieces, such as locks, sealing bodies, or the like.

The drawing illustrates an embodiment of the invention which will be explained in detail in the following.

Other objects, advantages and novel features of the present invention will become apparent from the following detailed description of the invention when considered in conjunction with the accompanying drawings.

DETAILED DESCRIPTION OF THE DRAWINGS

Figure 1:
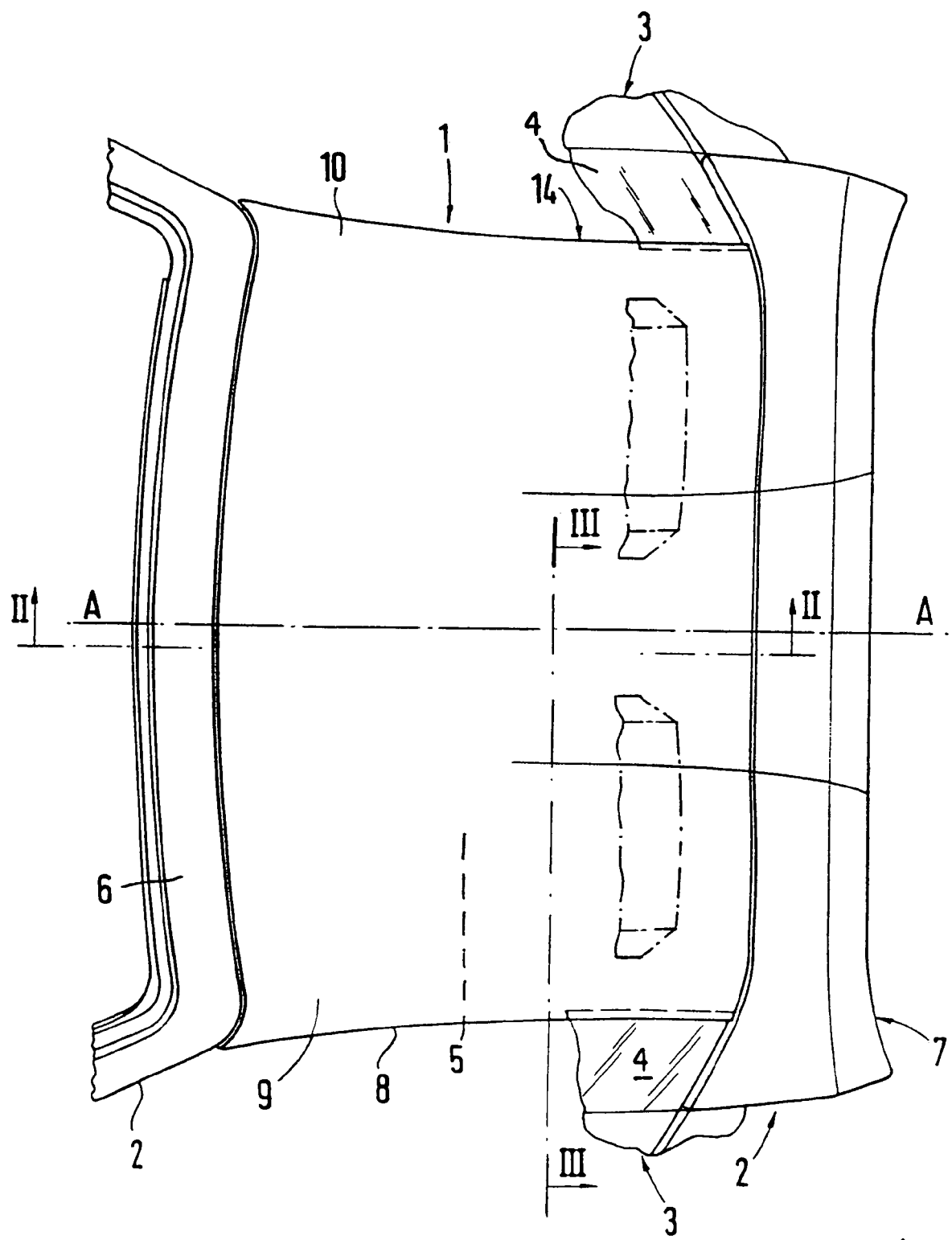
FIG. 1 is a top view of a passenger car, constructed according to preferred embodiments of the invention.

A passenger car 1 of the sports car type—dynamic-appearing styling and superior driving performance—comprises a vehicle body 2 with two opposite side doors 3 provided with door window glass panes 4. The vehicle body 2 bounds an occupant compartment 5 and has a windshield frame 6 and a rollover bar system 7. The occupant compartment 5 is overarched by a removable roof 8 which is supported on the windshield frame 6 and on the rollover bar system 7. The roof 8, which easily can be detached from the passenger car 1 and be fixed again on it, is formed by two roof elements 9 and 10 which are fitted together in a longitudinal center plane A-A and, when separated from the vehicle body, can be stored, for example, in a storage space integrated in the vehicle body 2. Each roof element 9, 10 has an exterior wall 11 as well as an interior wall 12—FIGS. 2–3—which are relatively thin-walled, are produced separately from one another and consist of a high-strength—for example, carbon-fiber-reinforced—plastic material—CFK—. For forming a rigid member connection 13, the exterior wall 11 and the interior wall 12 meet at the edge zones RI, RII, RIII, RIV and RV of the roof element and are connected with one another, for example, by gluing. In order to achieve a stability of the member connection 13 which is as high as possible and also an easily paintable outer surface of the exterior wall 11—no pressure points—, the exterior wall 11 and the interior wall 12 extend at a relatively narrow mutual distance As over a significant area Bw. As a result of this embodiment, at the given vehicle height, the headroom for the occupants can be designed in an advantageous manner.

Figure 2:
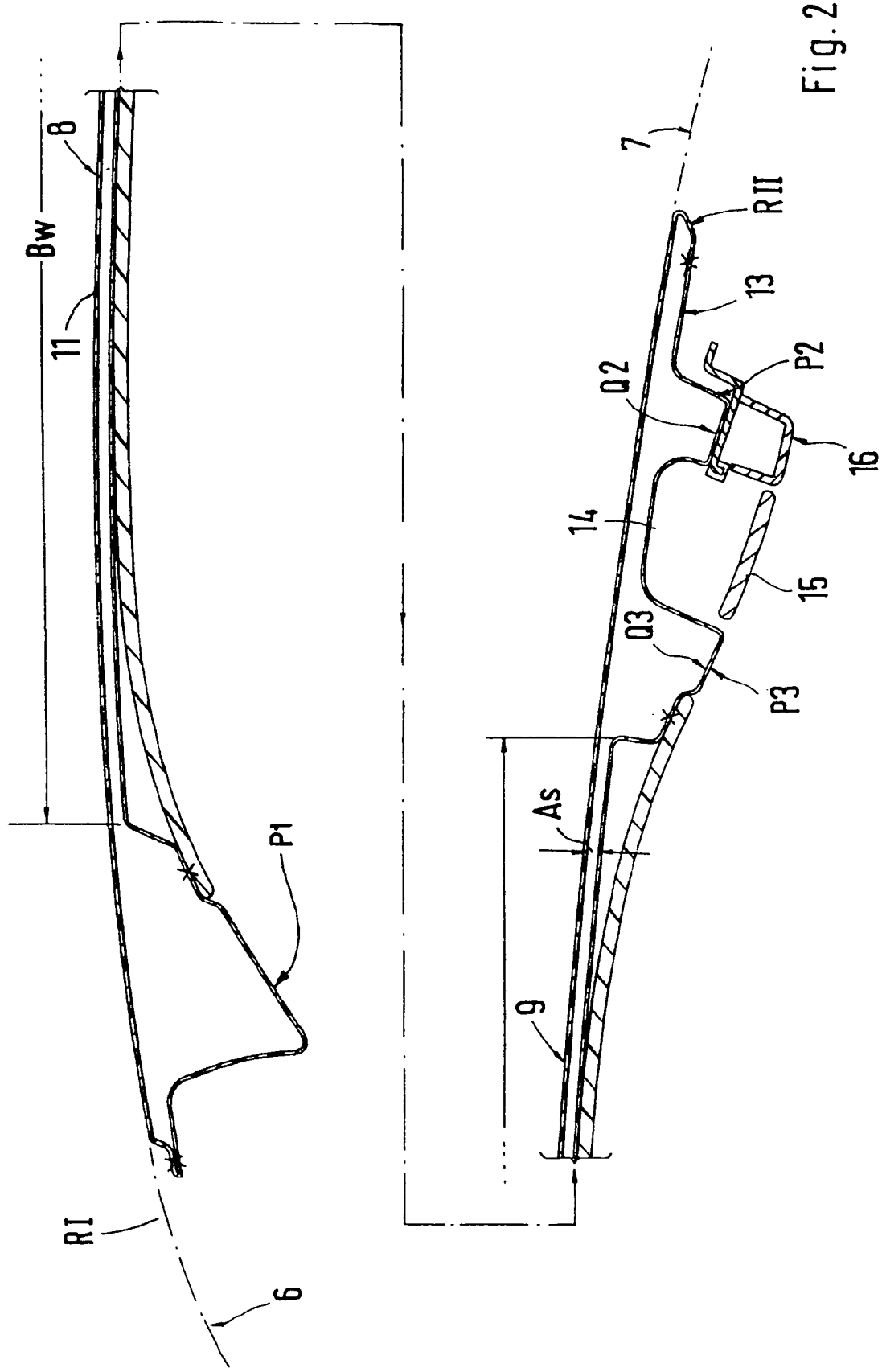
FIG. 2 is a sectional view taken along Line II—II of FIG. 1.

In a longitudinal sectional view of the passenger car 1 according to FIG. 2, at least the interior wall 12 adjacent to the forward edge zone RI and to the rearward edge zone RII is provided with a first profiling P1 and a second profiling P2 respectively, and, in the proximity of the second profiling P2, a third profiling P3 is worked into the interior wall 12 which faces the windshield frame 6. The second profiling P2 and the third profiling P3, which have an approximately U-shaped cross-section Q2 and Q3, are arranged with respect to one another such that a shaping-in 14 with a U-shaped cross-section is obtained which is used for receiving a manual lever 15 of a roof locking device 16. The latter interacts between the roof 8 or the roof elements 9, 10 and the rollover bar system 7. Furthermore, the second profiling P2 is constructed for holding the roof locking device 16.

Figure 3:
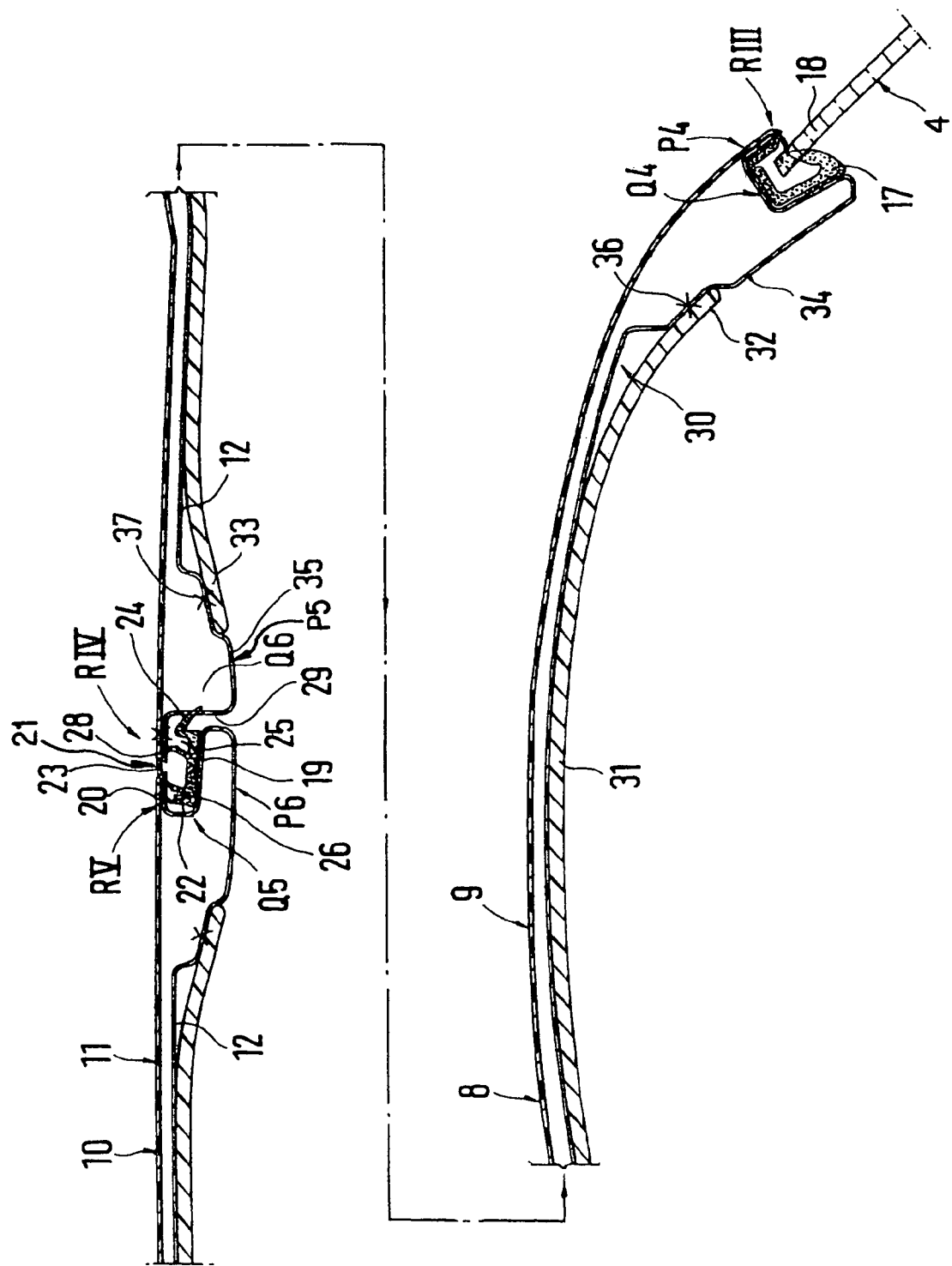
FIG. 3 is a sectional view taken along Line III—III.

FIG. 3 is a cross-sectional view of the passenger car 1 in the area of the roof 8, which shows that, at the edge zone RIII facing the lateral door window glass pane 4 of the door, the roof element 9 comprises a fourth profiling P4. The fourth profiling P4 has a U-shaped cross-section Q4 which is open toward the door window glass pane 4, is suitable for receiving a first sealing body 17 and reaches around an end area 18 of the above-mentioned door window glass pane 4. Likewise, it is illustrated in this FIG. 3 that the roof elements 9, 10 have a fifth profiling P5 and a sixth profiling P6 in the edge zones RIV and RV facing the longitudinal center plane A—A. The sixth profiling P6 has a U-shaped cross-section Q5 which is rotated by 90° and is open toward the fifth profiling P5, the cross-section Q5 having an interior leg 19 and an exterior leg 20. The interior leg 19 carries a second sealing body 21 which is provided with a first sealing lip 22, a hose body 23 and a second sealing lip 24, which sealing lips 22 and 24 bound the hose body 23 on the longitudinal sides 25 and 26. The first sealing lip 22 and the hose body 23 sealingly interact with an interior side of the exterior leg 20 which is constructed in the manner of a flange. In contrast, the fifth profiling P5 is an angular cross-section Q6 which, by means of a flange 28, at least in sections, projects beyond the sixth profiling P6 and the cross-section Q5 respectively and sealingly cooperates with the hose body 23. In this case, the second sealing lip 24 rests on an upright web 29 of the cross-section Q6.

Finally, a relatively thin-walled but sound-insulating covering wall 31—FIG. 3—is mounted on an interior side 30 of the interior wall 12, which covering wall 31 is made of a suitable material, for example, a plastic material, and extends at a distance which is as small as possible from the above-mentioned interior wall 12, so that the headroom for the occupants is not impaired along a significant area of the roof 8. For this purpose, end areas 32 and 33 of the covering wall 31 of the roof element 9 extend flush with the wall sections 34 and 35 of the profilings P4 and P5, in which case the end areas 32 and 33 are connected by means of gluing with corresponding receiving sections 36 and 37 of the interior wall 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Removable roof, for a passenger car of the sports car type, between a windshield frame and a rollover bar system, which roof is made of a plastic material and comprises an exterior wall as well as an interior wall,
   wherein the exterior wall and the interior wall of the roof are made of a high-strength plastic material and form a rigid member connection, the exterior wall and the interior wall meeting only at edge zones of the roof,
   wherein the exterior wall and the interior wall extend at a mutual distance with respect to one another along a significant area delimited by inwardly expanded interior wall profilings, and
   wherein the interior wall includes a shaping-in used for receiving a manual lever of a roof locking device interacting between the roof and said rollover bar section.

2. Removable roof according to claim 1, wherein the exterior wall and the interior wall consist of a carbon-fiber-reinforced plastic material.

3. Removable roof according to claim 2, wherein the exterior wall and the interior wall are produced separately from one another and are connected with one another at the edge zones by gluing.

4. Removable roof according to claim 1, wherein the interior wall profilings include a first profiling provided adjacent to a forward edge zone and a second profiling provided adjacent to a rearward edge zone.

5. Removable roof according to claim 4, wherein adjacent to the second profiling, a third profiling is provided, and wherein the shaping-in is provided between the second profiling and the third profiling.

6. Removable roof according to claim 5, wherein the second profiling is constructed for holding the roof locking device.

7. Removable roof according to claim 4, wherein at least the second profiling and the third profiling have approximately U-shaped cross-sections.

8. Removable roof according to claim 5, wherein in a cross-sectional view of the roof, fourth profilings are provided on lateral edge zones adjoining door window glass panes of doors of a vehicle body.

9. Removable roof according to claim 8, wherein each fourth profiling has a U-shaped cross-section, which is open toward one of the door window glass panes and is constructed for receiving a sealing body for the door window glass pane.

10. Removable roof according to claim 9, wherein the U-shaped cross-section of the fourth profiling reaches around an end area of the door window glass pane.

11. Removable roof according to claim 9, comprising two roof elements formed with respective exterior and interior walls, said roof elements being fitted together in use in a longitudinal center plane of the passenger car, wherein the roof elements have a fifth profiling and a sixth profiling at respective edge zones facing the longitudinal center plane.

12. Removable roof according to claim 11, wherein the sixth profiling has a U-shaped cross-section which is rotated by 90° with respect to the longitudinal centerplane and is open toward the fifth profiling, an interior leg thereof carrying a second sealing body.

13. Removable roof, for a passenger car of the sports car type, between a windshield frame and a rollover bar system, which roof is made of a plastic material and comprises an exterior wall as well as an interior wall,
   wherein the exterior wall and the interior wall of the roof are made of a high-strength plastic material and form a rigid member connection, the exterior wall and the interior wall meeting only at edge zones of the roof,
   wherein in a longitudinal sectional view of the roof, at least the interior wall adjacent to a forward edge zone and adjacent to a rearward edge zone is provided with a first profiling and a second profiling respectively,
   wherein adjacent to the second profiling, a third profiling is provided, a shaping-in for receiving a manual lever of a roof locking device being provided between the second profiling and the third profiling,
   wherein in a cross-sectional view of the roof, fourth profilings are provided on lateral edge zones adjoining door window glass panes of doors of a vehicle body,
   wherein each fourth profiling has a U-shaped cross-section, which is open toward one of the door window glass panes and is constructed for receiving a sealing body for the door window glass pane,
   wherein two roof elements are formed with respective exterior and interior walls, said roof elements being fitted together in use in a longitudinal center plane of the passenger car,
   wherein the roof elements have a fifth profiling and a sixth profiling at respective edge zones facing the longitudinal center plane,
   wherein the sixth profiling has a U-shaped cross-section which is rotated by 90° with respect to the longitudinal centerplane and is open toward the fifth profiling, an interior leg thereof carrying a second sealing body, and wherein the second sealing body comprises a first sealing lip, a hose body and a second sealing lip, which sealing lips bound the hose body on longitudinal sides thereof.

14. Removable roof according to claim 13, wherein the first sealing lip and the hose body sealingly cooperate with an exterior leg of the U-shaped cross-section of the sixth profiling.

15. Removable roof according to claim 14, wherein the fifth profiling comprises at least one angular cross-section which, by means of a flange, projects beyond the sixth profiling and sealingly cooperates with the hose body, the second sealing lip sealingly resting against an upright web of the angular cross-section of the fifth profiling.

16. Removable roof according to claim 1, wherein a covering wall made of a sound-insulating material is provided on an interior side of the interior wall.

17. Removable roof according to claim 16, wherein the covering wall is constructed flush with wall sections of profilings at lateral edges of the interior wall.

18. Removable roof according to claim 11, wherein a covering wall made of a sound-insulating material is provided on an interior side of the interior wall.

19. Removable roof according to claim 18, wherein the covering wall is constructed flush with wall sections of the fourth and fifth profilings.

20. A removable roof element for a passenger car, comprising:
   a plastic exterior wall having edge zones around its periphery,
   a plastic interior wall having edge zones around its periphery, said exterior wall and interior wall being spaced from one another except at the edge zones, and
   connecting means for connecting the exterior wall and interior wall together only at said edge zones,
   wherein the exterior wall and the interior wall extend at a mutual distance with respect to one another along a significant area delimited by inwardly expanded interior wall profilings, and
   wherein the interior wall includes a shaping-in used for receiving a manual lever of a roof locking device interacting between the roof and said rollover bar section.

21. A removable roof element according to claim 20, wherein the exterior wall and the interior wall consist of a carbon-fiber-reinforced plastic material.

22. A removable roof element according to claim 20, wherein said connecting means includes glue.

23. A method of making a removable roof element for a passenger car, comprising:
   forming a plastic exterior wall with edge zones around its periphery,
   forming a plastic interior wall with edge zones around its periphery and including a shaping-in used for receiving a manual lever of a roof element locking device interacting between the roof element and a rollover bar section of the passenger car,
   placing the exterior wall and said interior wall with their respective edge zones facing one another and with remaining portions of the exterior wall and interior wall spaced from one another, and
   connecting the exterior and interior walls only at said edge zones so that the exterior wall and the interior wall extend at a mutual distance with respect to one another along a significant area delimited by inwardly expanded interior wall profilings.

24. A method according to claim 23, wherein the exterior wall and the interior wall consist of a carbon-fiber-reinforced plastic material.

25. A method according to claim 23, wherein said connecting includes gluing said edge zones together.

26. A method according to claim 24, wherein said connecting includes gluing said edge zones together.

* * * * *